(12) United States Patent
Boer et al.

(10) Patent No.: US 11,815,381 B2
(45) Date of Patent: Nov. 14, 2023

(54) ULTRASONIC FLOWMETER, USE OF AN ULTRASONIC FLOWMETER IN A SHUT-OFF DEVICE AND SHUT-OFF DEVICE

(71) Applicant: FOCUS-ON V.O.F., Dordrecht (NL)

(72) Inventors: Adriaan Hendrik Boer, Sliedrecht (NL); Kavreet Bhangu, Bruckmühl (DE); Jeroen Martin van Klooster, Tiel (NL)

(*) Notice: Subject to any disclaimer, the term of this patent is extended or adjusted under 35 U.S.C. 154(b) by 464 days.

(21) Appl. No.: 16/894,331

(22) Filed: Jun. 5, 2020

(65) Prior Publication Data

US 2020/0386594 A1 Dec. 10, 2020

(30) Foreign Application Priority Data

Jun. 7, 2019 (EP) ..................................... 19179100

(51) Int. Cl.
*G01F 1/66* (2022.01)
*G01F 15/06* (2022.01)

(52) U.S. Cl.
CPC ............ *G01F 1/662* (2013.01); *G01F 15/066* (2013.01)

(58) Field of Classification Search
CPC ................................ G01F 1/662; G01F 15/066
USPC ....................................................... 73/861.27
See application file for complete search history.

(56) References Cited

U.S. PATENT DOCUMENTS

| | | | | |
|---|---|---|---|---|
| 6,330,831 B1* | 12/2001 | Lynnworth | ............. | G01F 1/662 |
| | | | | 73/861.28 |
| 7,823,463 B1* | 11/2010 | Feller | ...................... | G01F 1/667 |
| | | | | 73/861.27 |
| 2012/0090702 A1* | 4/2012 | Shalev | ..................... | G01F 15/06 |
| | | | | 137/486 |
| 2016/0265954 A1* | 9/2016 | Bachmann | .............. | G01F 1/667 |

FOREIGN PATENT DOCUMENTS

| | | |
|---|---|---|
| DE | 102007004936 A1 | 6/2008 |
| DE | 102013218827 A1 | 3/2014 |
| EP | 0639776 A1 | 2/1995 |

* cited by examiner

*Primary Examiner* — Nathaniel T Woodward
(74) *Attorney, Agent, or Firm* — Patrick D. Duplessis

(57) ABSTRACT

An ultrasonic flowmeter includes a measuring tube, a first transducer pair including first and second ultrasonic transducers, and a second transducer pair including third and fourth ultrasonic transducers. Each ultrasonic transducer is an ultrasonic transmitter and/or an ultrasonic receiver. The first transducer pair is on the measuring tube offset such that the respective transmitter transmits an ultrasonic signal in or against the direction of flow, and the receiver receives the ultrasonic signal after a reflection. A course of the ultrasonic signal between the first and second ultrasonic transducers defines a first signal path. The second transducer pair is on the measuring tube offset such that the respective transmitter transmits an ultrasonic signal in or against the direction of flow, and the receiver receives the ultrasonic signal after a reflection. A course of the ultrasonic signal defines a second signal path between the third ultrasonic transducer and the fourth ultrasonic transducer.

16 Claims, 3 Drawing Sheets

ULTRASONIC FLOWMETER, USE OF AN ULTRASONIC FLOWMETER IN A SHUT-OFF DEVICE AND SHUT-OFF DEVICE

TECHNICAL FIELD

The invention is based on an ultrasonic flowmeter with at least one measuring tube, with at least one first ultrasonic transducer pair comprising a first ultrasonic transducer and a second ultrasonic transducer and at least one second ultrasonic transducer pair comprising a third ultrasonic transducer and a fourth ultrasonic transducer, wherein each ultrasonic transducer is designed as an ultrasonic transmitter and/or as an ultrasonic receiver, wherein the first pair of ultrasonic transducers is arranged on the measuring tube offset as viewed in the direction of flow such that the respective transmitter transmits an ultrasonic signal in the direction of flow or against the direction of flow during operation and that the receiver receives the ultrasonic signal transmitted by the transmitter after at least one reflection, wherein at least one reflecting surface is provided and wherein the course of the ultrasonic signal between the first ultrasonic transducer and the second ultrasonic transducer defines a first signal path, wherein the second pair of ultrasonic transducers is arranged on the measuring tube offset as viewed in the direction of flow such that the respective transmitter transmits an ultrasonic signal in the direction of flow or against the direction of flow during operation and that the receiver receives the ultrasonic signal transmitted by the transmitter after at least one reflection, wherein at least one reflecting surface is provided and wherein the course of the ultrasonic signal defines a second signal path between the third ultrasonic transducer and the fourth ultrasonic transducer.

Furthermore, the invention relates to the use of an ultrasonic flowmeter in a shut-off device, wherein the shut-off device has a flow channel and a blocking device arranged in the flow channel, wherein the blocking device has a blocking body receptacle and a blocking body movable in the blocking body receptacle, wherein the flow cross-section for the medium in the blocking device and thus in the flow channel can be changed by moving the blocking body in the blocking body receptacle, wherein the flow channel has an inlet region upstream of the blocking device, viewed in the direction of flow.

In addition, the invention also relates to a shut-off element with an ultrasonic flowmeter, wherein the shut-off device has a flow channel and a blocking device arranged in the flow channel, wherein the blocking device has a blocking body receptacle and a blocking body movable in the blocking body receptacle, wherein the flow cross-section for the medium in the blocking device and thus in the flow channel can be changed by moving the blocking body in the blocking body receptacle, wherein the flow channel has an inlet region upstream of the blocking device as viewed in the direction of flow.

BACKGROUND

The measurement of the flow of a medium flowing through a measuring tube with an ultrasonic flowmeter is known from the state of the art. Ultrasonic flowmeters generally have a measuring tube and at least two ultrasonic transducers designed as ultrasonic transmitters and/or ultrasonic receivers, which are arranged on the measuring tube at a distance from each other in the direction of flow (axially in relation to the measuring tube axis). To measure the flow, an ultrasonic signal is transmitted along the signal path between the ultrasonic transducers both in the direction of flow and against the direction of flow. Due to the entrainment effect, there is a different transit time from the signals moving along a signal path with or against the flow. The difference in transit time is used to determine the flow velocity and, taking the measuring tube cross-section into account, the volume flow rate.

Ultrasonic flowmeters having more than one pair of ultrasonic transducers are also known, so that two or more signal paths can be evaluated for determining the flow rate.

For example, the document DE 10 2007 004 936 B4 discloses an ultrasonic flowmeter with at least two pairs of ultrasonic transducers, wherein the ultrasonic transducers of each pair of ultrasonic transducers is arranged offset to one another on a common circumferential half in the longitudinal direction of the measuring tube and wherein the ultrasonic reflector associated with the respective pair of ultrasonic transducers is arranged on the other circumferential half between the two ultrasonic transducers, viewed in the longitudinal direction of the measuring tube, so that an ultrasonic signal transmitted by one ultrasonic transducer of an ultrasonic transducer pair passes along a V-shaped signal path via the ultrasonic reflector associated with the ultrasonic transducer pair to the other ultrasonic transducer of the ultrasonic transducer pair, wherein the first ultrasonic transducer pair and the second ultrasonic reflector are arranged on one circumferential half and the second ultrasonic transducer pair and the first ultrasonic reflector are arranged on the other circumferential half.

Document EP 0 639 776 A1 also discloses an ultrasonic flowmeter having a plurality of ultrasonic transducer pairs, wherein the ultrasonic transducer pairs are arranged on the measuring tube such that the flowing medium is passed through by means of several ultrasonic signals having a different degree of sensitivity with respect to vortices in the flow profile.

In addition, it is known from document DE 10 2013 218 827 A1 to provide ultrasonic flowmeters for flow measurement on or in the housing of a shut-off device so that the volume or mass flow can be controlled based on the measured flow rate.

Especially in shut-off devices, but also in other applications, there is often the problem that bends or cross-sectional changes of the measuring tube cause irregularities in the flow profile, which lead to inaccuracies in the flow measurement at the measuring site. In detail, e.g. vortices present in the flowing medium to be measured generate radial and tangential velocity components which falsify the measurement of the velocity of the flowing medium. It is particularly problematic if the measuring site is located immediately in front of or behind or in the vicinity of such areas causing a disturbance of the flow profile.

SUMMARY

Based on the state of the art as presented, it is thus the object of the invention to provide an ultrasonic flowmeter which allows a particularly reliable flow measurement, especially in critical fields of application. Furthermore, it is the object of the invention to provide the use of such a flowmeter in a shut-off device and a corresponding shut-off device.

According to a first teaching of the present invention, the previously described object is thereby achieved by an ultrasonic flowmeter mentioned at the beginning, in that the signal course of the first signal path in relation to the measuring tube axis has a first direction of rotation and that the signal course of the second signal path has a second direction of rotation, wherein the second direction of rotation is opposite the first direction of rotation and the first signal path and the second signal path have at least one common reflecting surface.

According to the invention, it was recognized that flowing media which, for example, have vortices that disturb flow measurement can be measured particularly reliably by detecting the medium by means of at least two signal paths which pass through the medium in different directions of rotation with respect to the measuring tube axis. In this way, radial or tangential velocity components causing errors can be filtered out particularly advantageously.

The reflecting surface(s) can be formed by reflecting elements inserted into the measuring tube and/or the measuring tube can be appropriately flattened in the area of at least one reflecting surface. Depending on the design of the signal paths, the reflecting surface(s) can be at least partially set back in relation to the inner wall of the measuring tube and/or project into the measuring tube interior and/or be designed flush with the inner wall of the measuring tube.

According to the invention, the first signal path and the second signal path also have at least one common reflecting surface. In this way, the arrangement of at least two pairs of ultrasonic transducers can, on the one hand, also be used in tight spaces and, on the other hand, such an arrangement is particularly easy to produce, since the number of reflecting surfaces to be manufactured is minimized.

In addition, the ultrasonic flowmeter has a control and evaluation unit that determines the flow of a flowing medium based on at least the two ultrasonic signals.

According to an advantageous further development, the measuring tube has a measuring tube axis, wherein a mirror plane is defined by the measuring tube axis and an axis perpendicular to the measuring tube, which divides the measuring tube in axial plan view into a first half and a second half, and wherein the second signal path essentially corresponds to a reflection of the first signal path at the mirror plane. In this way it can be ensured that the flow profile is scanned symmetrically in two opposite directions of rotation. The measuring tube axis is curved at least in sections according to one design of the flowmeter. Accordingly, the measuring tube is also curved in this design, at least in sections.

In addition, it is advantageous if the first signal path has at least two reflections, wherein at least two reflecting surfaces are provided so that the course of the signal in axial plan view corresponds to a closed signal path, preferably in the form of a triangle, and if the second signal path has at least two reflections, wherein at least two reflecting surfaces are provided so that the signal course of the signal in axial plan view corresponds to a closed signal path, preferably in the form of a triangle. This design has the advantage that the flow profile is scanned essentially circularly so that a particularly large area of the flow profile can be detected.

In addition to the shape of a triangle, other closed signal path shapes are also conceivable, for example, the signal paths can have the shape of a quadrangle or a pentagon in axial plan view. In this way it is possible to also measure further external edge areas of the flow profile.

According to a next design of the ultrasonic flowmeter, as an alternative to a closed path course, the first signal path and the second signal path are designed such that the respective signal path corresponds to an open path course in axial plan view.

According to a next design, the first signal path and the second signal path are essentially congruent in axial plan view of the measuring tube. The first signal path and the second signal path in axial plan view of the measuring tube are arranged essentially congruently one above the other. This ensures that each individual path section of the first and second signal path is passed through in the opposite directions of rotation, resulting in a particularly high measuring accuracy.

It is also particularly advantageous if the ultrasonic transducers of the first ultrasonic transducer pair are arranged on the measuring tube opposite the corresponding ultrasonic transducers of the second ultrasonic transducer pair, especially symmetrically with respect to the mirror plane.

In principle, an arrangement in which the first ultrasonic transducer pair and the second ultrasonic transducer pair are arranged within the same section of the measuring tube is advantageous. Such an arrangement is particularly suitable for use in short measuring tubes.

For example, the first ultrasonic transducer of the first ultrasonic transducer pair and the third ultrasonic transducer of the second ultrasonic transducer pair are arranged on the circumference of a first measuring tube cross-sectional area, and furthermore the second ultrasonic transducer of the first ultrasonic transducer pair and the fourth ultrasonic transducer of the second ultrasonic transducer pair are arranged on the circumference of a second measuring tube cross-sectional area.

According to a next design, the measuring tube has a measuring tube cross-sectional area, wherein the shape and/or the size of the measuring tube cross-sectional area changes in the course of the first signal path and the second signal path. Here, preferably the ultrasonic transducers and the at least one common reflecting surface are arranged such that the measurement of the medium in those areas of the measuring tube which have an expansion of the measuring tube cross-section is avoided.

Particularly preferably, the measuring tube exhibits a reduction in cross-section in the course of the first signal path and the second signal path. Alternatively, the measuring tube can also have a cross-sectional expansion in the course of the first signal path and the second signal path.

According to one design, the measuring tube cross-sectional area is essentially circular in the area of the first ultrasonic transducer and the third ultrasonic transducer and essentially oval in the area of the second ultrasonic transducer and the fourth ultrasonic transducer.

The two pairs of ultrasonic transducers are arranged on the measuring tube such that vortex formation within the flowing medium due to the change in the measuring tube has the least possible effect and at the same time the determination of the velocity of a turbulent or laminar flow profile has the least possible error.

A next configuration is characterized in that the ultrasonic transducers are arranged such that at least the first section of the first signal path and the second signal path measure the flowing medium in the range $r=0.5\ R$ or $r>0.5\ R$ or $r>0.3\ R$, where R denotes the radius of the measuring tube cross-sectional area in the region of the measuring tube inlet upstream of the first and third ultrasonic transducer.

Preferably the last section of the first signal path and the second signal path is arranged in the range $r=0.5\ R$ or $r>0.5\ R$ or $r>0.3\ R$, where R denotes the radius of the measuring tube cross-sectional area in the region of the measuring tube inlet.

According to a second teaching of the present invention, the object mentioned above is achieved by using an ultrasonic flowmeter in a shut-off device as described above in that the ultrasonic flowmeter has at least one measuring tube, at least one first ultrasonic transducer pair comprising a first ultrasonic transducer and a second ultrasonic transducer and at least one second ultrasonic transducer pair comprising a third ultrasonic transducer and a fourth ultrasonic transducer, wherein each ultrasonic transducer is designed as an ultrasonic transmitter and/or as an ultrasonic receiver, that the first pair of ultrasonic transducers is arranged on the measuring tube offset as viewed in the direction of flow such that the respective transmitter transmits an ultrasonic signal in the direction of flow or against the direction of flow during operation and that the receiver receives the ultrasonic signal transmitted by the transmitter after at least one reflection, wherein at least one reflecting surface is provided, and wherein the course of the ultrasonic signal between the first ultrasonic transducer and the second ultrasonic transducer defines a first signal path, that the second pair of ultrasonic transducers is arranged on the measuring tube offset as viewed in the direction of flow such that the respective transmitter transmits an ultrasonic signal in the direction of flow or against the direction of flow during operation, and that the receiver receives the ultrasonic signal transmitted by the transmitter after at least one reflection, wherein at least one reflecting surface is provided and the course of the ultrasonic signal defines a second signal path between the third ultrasonic transducer and the fourth ultrasonic transducer, that the measuring tube of the ultrasonic flowmeter is formed at least as part of the flow channel, and that the signal course of the first signal path has a first direction of rotation with respect to the measuring tube axis, and that the signal course of the second signal path has a second direction of rotation, wherein the second direction of rotation is opposite the first direction of rotation, and that the first signal path and the second signal path have at least one common reflecting surface.

According to a particularly preferred design, the ultrasonic flowmeter is designed according to one of the previously described configurations.

The design of the ultrasonic flowmeter according to the invention ensures reliable determination of the flow rate of a flowing medium, especially in different positions of the movable blocking body and insofar when the flow cross-section in the flow channel changes, which also improves the functioning of the blocking element.

According to a third teaching of the present invention, the object described above is achieved by a shut-off device with an ultrasonic flowmeter, in that the ultrasonic flowmeter has at least one measuring tube, at least one first ultrasonic transducer pair comprising a first ultrasonic transducer and a second ultrasonic transducer and at least one second ultrasonic transducer pair comprising a third ultrasonic transducer and a fourth ultrasonic transducer, wherein each ultrasonic transducer is designed as an ultrasonic transmitter and/or as an ultrasonic receiver, that the first ultrasonic transducer pair is arranged offset in the direction of flow on the measuring tube such that the respective transmitter transmits an ultrasonic signal in the direction of flow or against the direction of flow during operation, and that the receiver receives the ultrasonic signal transmitted by the transmitter after at least one reflection, wherein at least one reflecting surface is provided, and wherein the course of the ultrasonic signal between the first ultrasonic transducer and the second ultrasonic transducer defines a first signal path, that the second ultrasonic transducer pair is arranged on the measuring tube offset as viewed in the direction of flow such that the respective transmitter transmits an ultrasonic signal in the direction of flow or against the direction of flow during operation, and that the receiver receives the ultrasonic signal transmitted by the transmitter after at least one reflection, wherein at least one reflecting surface is provided, and wherein the course of the ultrasonic signal defines a second signal path between the third ultrasonic transducer and the fourth ultrasonic transducer, that the measuring tube of the ultrasonic flowmeter is formed at least as part of the flow channel, and that the signal course of the first signal path has a first direction of rotation with respect to the measuring tube axis, and that the signal course of the second signal path has a second direction of rotation, wherein the second direction of rotation is opposite the first direction of rotation, and that the first signal path and the second signal path have at least one common reflecting surface.

The ultrasonic flowmeter is particularly preferably designed according to one of the above described configurations.

BRIEF DESCRIPTION OF THE DRAWINGS

In detail, there are now a multitude of possibilities for designing and further developing the ultrasonic flowmeter according to the invention, the use according to the invention and the shut-off device according to the invention. For this, reference is made to the following description of preferred embodiments in connection with the drawings.

DETAILED DESCRIPTION

Figure 1:
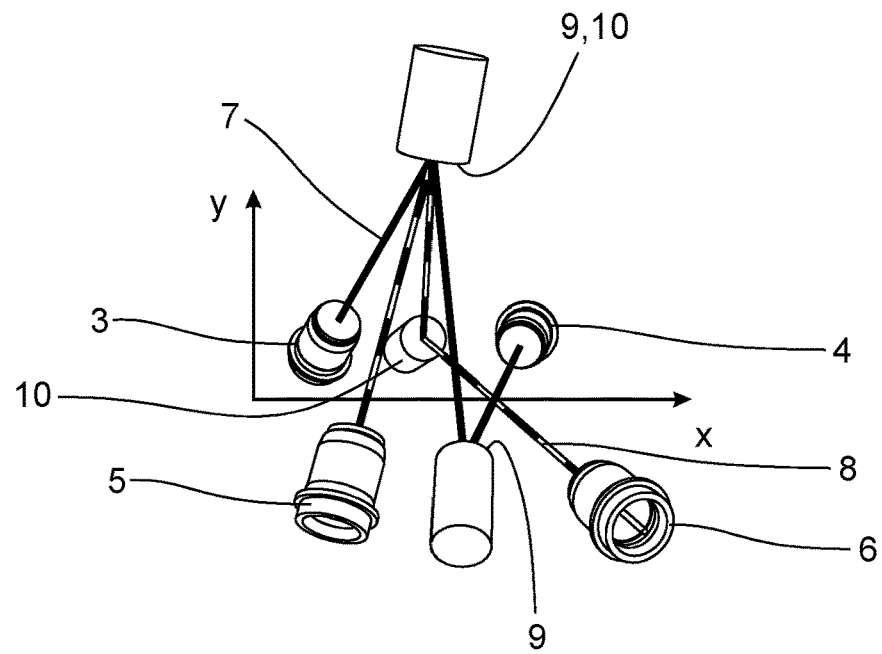
FIG. 1 illustrates a first arrangement of a first ultrasonic transducer pair and a second ultrasonic transducer pair according to the invention.

FIG. 1 shows a first arrangement of a first ultrasonic transducer pair 3, 4 with a first ultrasonic transducer 3 and a second ultrasonic transducer 4 and a second ultrasonic transducer pair 5,6 with a third ultrasonic transducer 5 and a fourth ultrasonic transducer 6, wherein each ultrasonic transducer 3, 4, 5, 6 is designed as an ultrasonic transmitter and as an ultrasonic receiver. The arrangement shown is suitable for use in an ultrasonic flowmeter 1 according to the invention.

In the arrangement shown, the first signal path 7 is formed between the first ultrasonic transducer pair 3, 4, and the second signal path 8 runs between the second ultrasonic transducer pair 5, 6. The second signal path 8 corresponds to a reflection of the first signal path 7 at the mirror plane, which is defined by the axes X and Y (XY plane).

The first signal path 7 has three sections separated by reflecting surfaces 9, 10. In addition, the second signal path 8 also has three subsections separated by reflecting surfaces 9, 10. A reflecting surface 9, 10 is common to signal paths 7 and 8 in the arrangement shown. The advantage of this arrangement is that it is particularly easy to manufacture due to the small number of reflecting surfaces and is also particularly suitable for use in short measuring tubes.

During operation, the X-axis denotes a possible direction of flow of the medium, so that the ultrasonic transducer pairs 3, 4 and 5, 6 are arranged such that, when used in an ultrasonic flowmeter 1 of the invention, they pass through the flowing medium in opposite directions of rotation (in axial view).

This arrangement thus has the advantage that existing vortices which cause fictitious velocity components can be filtered out particularly effectively by passing through them in opposite directions.

Figure 2:
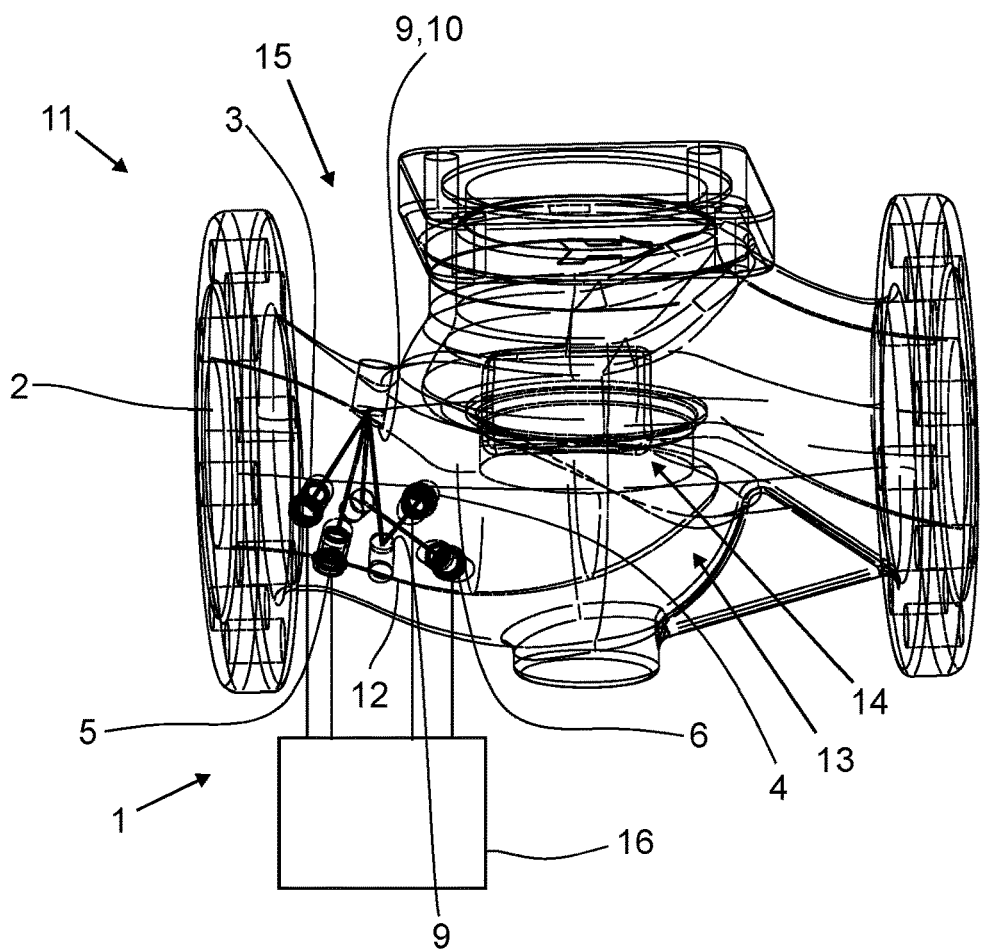
FIG. 2 illustrates a first embodiment of an ultrasonic flowmeter, an application and a shut-off device according to invention.

FIG. 2 shows the application of the arrangement of the first ultrasonic transducer pair 3, 4 and the second ultrasonic transducer pair 5, 6 shown in FIG. 1 in an ultrasonic flowmeter 1 and the use of the ultrasonic flowmeter 1 in a shut-off device 11.

The shut-off device 11 has a flow channel 12 and a blocking device 13 arranged in the flow channel 12, wherein the blocking device 13 has a blocking body receptacle and a blocking body 14 movable in the blocking body receptacle, wherein the flow cross-section for the medium in the blocking device 13 and thus in the flow channel 12 can be changed by moving the blocking body 14 in the blocking body receptacle, wherein the flow channel 12 has an inlet region 15 upstream of the blocking device 13, viewed in the direction of flow.

In the shut-off device 11 shown, the flow channel 12, in detail the inlet region 15, is designed as a measuring tube 2 of the ultrasonic flowmeter 1. The first ultrasonic transducer pair 3, 4 and the second ultrasonic transducer pair 5, 6 are mounted in the inlet region 15 on the flow channel 12 according to the arrangement described in FIG. 1. In addition, a control and evaluation unit 16 is provided which controls the ultrasonic transducers 3, 4, 5, 6 during operation and determines the flow rate of the medium from the transit times of the ultrasonic signals.

The measuring tube 2 or the flow channel 12 shows a change in the shape of the measuring tube cross-sectional area and the size of the measuring tube cross-sectional area in the inlet region 15, i.e. in the area of the first and second ultrasonic transducer pair 3, 4, 5, 6.

Figure 3:
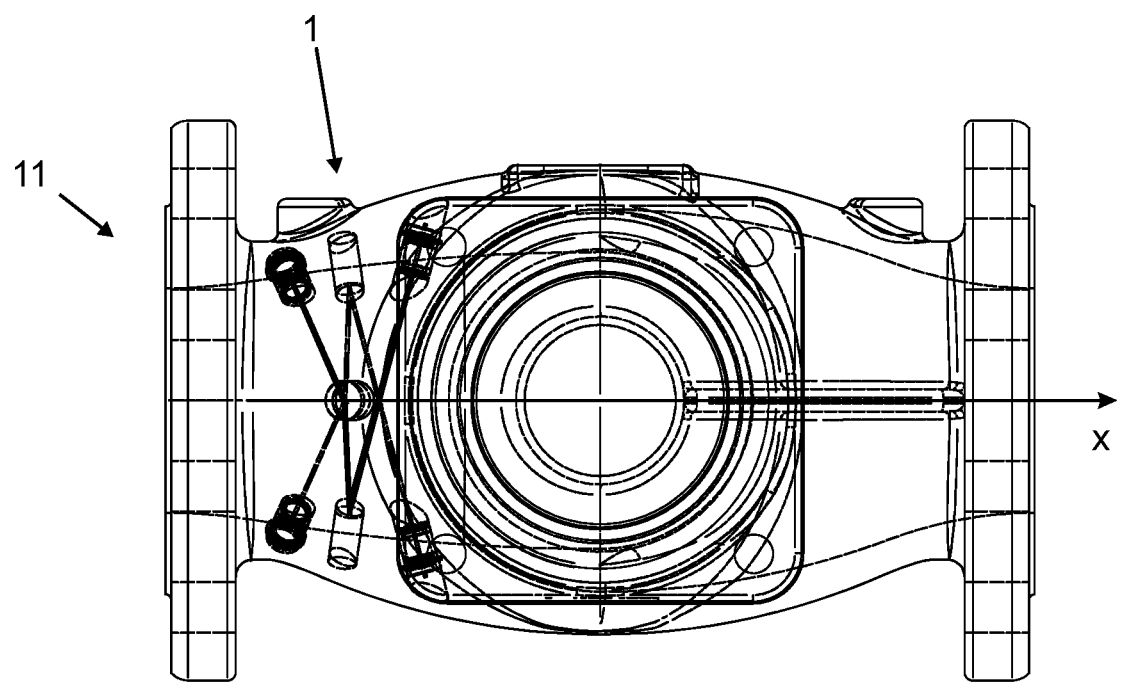
FIG. 3 illustrates the embodiment shown in FIG. 2 in a view from above.
Figure 4:
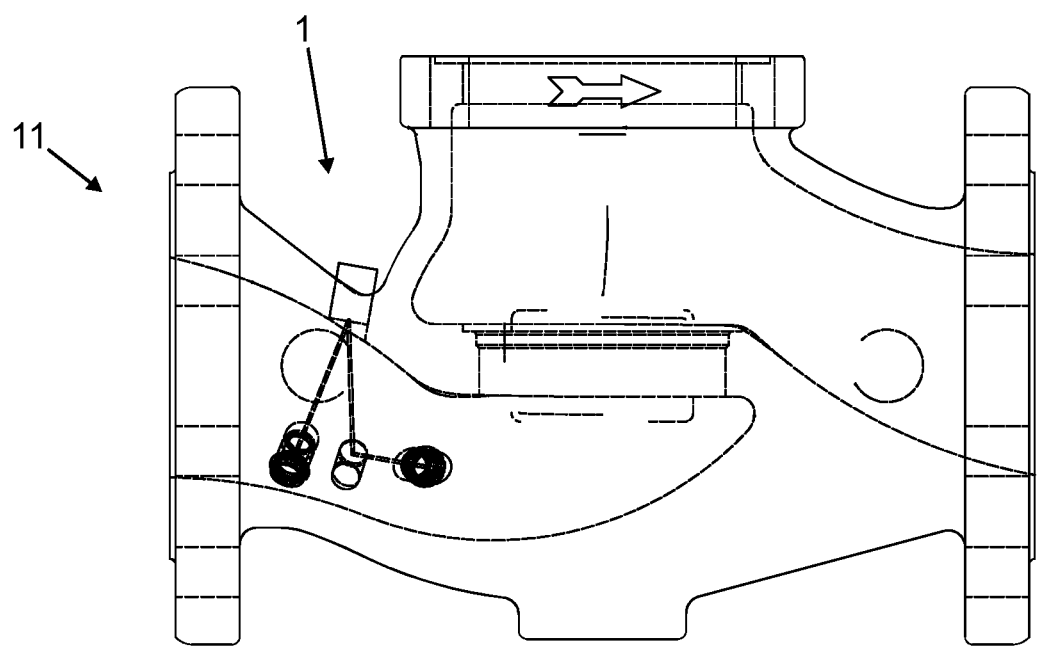
FIG. 4 illustrates the embodiment shown in FIG. 3 in side view.
Figure 5:
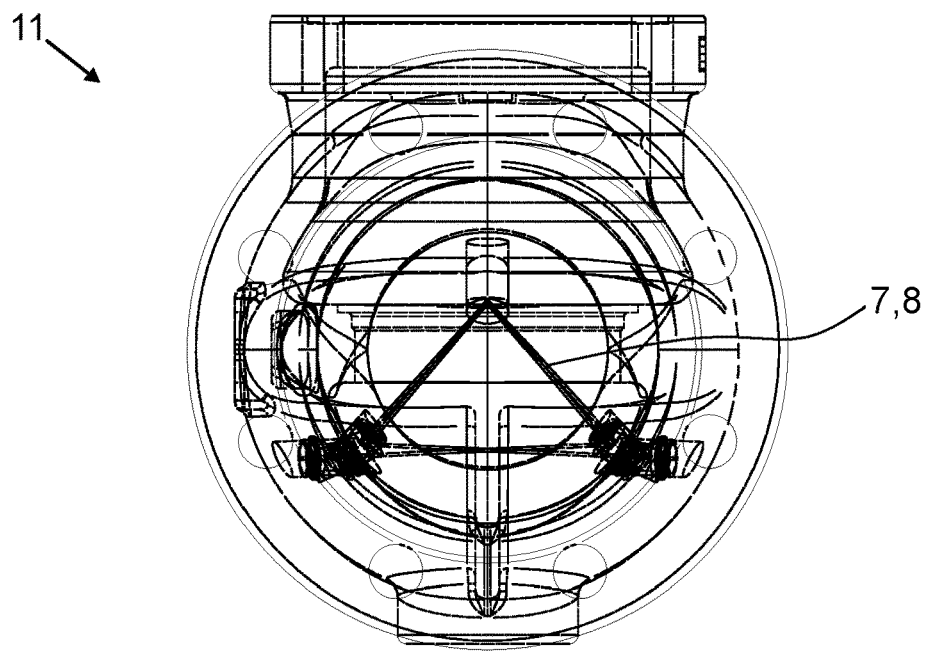
FIG. 5 illustrates the embodiment shown in FIG. 3 in axial top view.

FIGS. 3 to 5 show other views of the previously described arrangement. The top view of the shut-off device 11 shown in FIG. 3 shows particularly clearly the mirrored configuration of the second signal path 8 in relation to the first signal path 7 at the mirror plane. In the illustration, the measuring tube axis corresponds to the X-axis, the Y-axis protrudes vertically from the drawing plane.

FIG. 4 shows the embodiment described in FIG. 2 in side view.

In addition, FIG. 5 shows the congruent design of the first signal path 7 and the second signal path 8 in axial plan view of the measuring tube 2. Both signal paths 7, 8 form the closed shape of a triangle in axial plan view, wherein the signal paths 7 and 8 are essentially congruent with each other.

Figure 6:
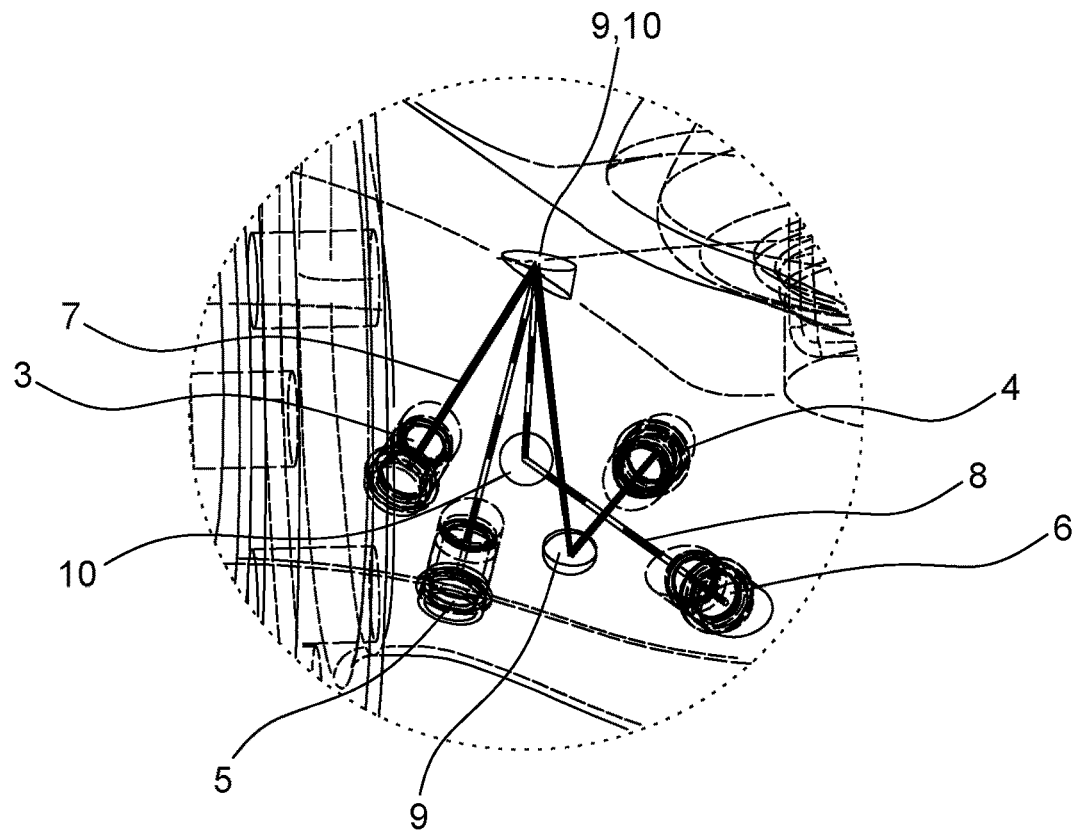
FIG. 6 illustrates a further embodiment of an arrangement in a shut-off device according to the invention.

FIG. 6 shows a further embodiment of an ultrasonic flowmeter 1 according to the invention in a shut-off device 11, wherein, in contrast to the illustrations shown in FIGS. 1 to 8, the reflecting surfaces 9, 10 are not formed by separately inserted reflection elements, but by machining the measuring tube 2 or the flow channel 12.

As a result, all figures show embodiments of the invention, wherein the flow can be determined particularly reliably even in demanding situations in which the flow profile is strongly disturbed due to a change in the measuring tube, in particular by the arrangement of the ultrasonic transducer pairs according to the invention.

The invention claimed is:

1. An ultrasonic flowmeter, comprising:
a measuring tube;
a first ultrasonic transducer pair including a first ultrasonic transducer and a second ultrasonic transducer; and
a second ultrasonic transducer pair including a third ultrasonic transducer and a fourth ultrasonic transducer;
wherein each ultrasonic transducer is designed as an ultrasonic transmitter and/or as an ultrasonic receiver;
wherein the first ultrasonic transducer pair is arranged on the measuring tube offset as viewed in a direction of flow, such that the respective transmitter transmits an ultrasonic signal in the direction of flow or against the direction of flow during operation, and such that the receiver receives the ultrasonic signal transmitted by the transmitter after at least one reflection, wherein at least one reflecting surface is provided, and wherein the course of the ultrasonic signal between the first ultrasonic transducer and the second ultrasonic transducer defines a first signal path;
wherein the second ultrasonic transducer pair is arranged on the measuring tube offset as viewed in the direction of flow, such that the respective transmitter transmits an ultrasonic signal in the direction of flow or against the direction of flow during operation, and such that the receiver receives the ultrasonic signal transmitted by the transmitter after at least one reflection, wherein at least one reflecting surface is provided, and wherein the course of the ultrasonic signal defines a second signal path between the third ultrasonic transducer and the fourth ultrasonic transducer;
wherein the signal course of the first signal path has a first direction of rotation with respect to the measurement tube axis, the signal course of the second signal path has a second direction of rotation, and the second direction of rotation is opposite the first direction of rotation;
wherein the first signal path and the second signal path have at least one common reflecting surface;
wherein the at least one common reflecting surface is an intentional reflection surface that is inserted or machined into the measuring tube; and
wherein the first ultrasonic transducer of the first ultrasonic transducer pair and the third ultrasonic transducer of the second ultrasonic transducer pair are arranged on the circumference of a first measuring tube cross-sectional area, and furthermore the second ultrasonic transducer of the first ultrasonic transducer pair and the fourth ultrasonic transducer of the second ultrasonic transducer pair are arranged on the circumference of a second measuring tube cross-sectional area.

2. The ultrasonic flowmeter according to claim 1, wherein the measuring tube has a measuring tube axis;
wherein a mirror plane is defined by the measuring tube axis and a line perpendicular to the measuring tube axis, which divides the measuring tube in axial plan view into a first half and a second half; and
wherein the second signal path substantially corresponds to a reflection of the first signal path at the mirror plane.

3. The ultrasonic flowmeter according to claim 1, wherein the first signal path has at least two reflections, wherein at least two reflecting surfaces are provided, so that the signal course in axial plan view corresponds to a closed signal path; and
    wherein the second signal path has at least two reflections and at least two reflecting surfaces are provided, so that the signal course in axial plan view corresponds to a closed signal path.

4. The ultrasonic flowmeter according to claim 1, wherein the first signal path and the second signal path are substantially congruent in axial plan view of the measuring tube.

5. The ultrasonic flowmeter according to claim 1, wherein the ultrasonic transducers of the first ultrasonic transducer pair are arranged on the measuring tube substantially opposite the respectively corresponding ultrasonic transducers of the second ultrasonic transducer pair.

6. The ultrasonic flowmeter according to claim 1, wherein the measuring tube has a measuring tube cross-sectional area; and
    wherein the shape and/or size of the measuring tube cross-sectional area changes in the course of the first signal path and the second signal path.

7. The ultrasonic flowmeter according to claim 6, wherein the measuring tube has a cross-sectional reduction or a cross-sectional expansion in the course of the first signal path and the second signal path.

8. The ultrasonic flowmeter according to claim 6, wherein the ultrasonic transducers are arranged such that at least a first section of the first signal path and of the second signal path allows the flowing medium to flow in the range r=0.5 R or r>0.5 R or r>0.3 R, where R denotes the radius of the measuring tube cross-sectional area in the region of the measuring tube inlet upstream of the first ultrasonic transducer and the third ultrasonic transducer.

9. The ultrasonic flowmeter according to claim 6, wherein the ultrasonic transducers and the at least one common reflecting surface are arranged such that the measurement of the medium is avoided in the regions of the measuring tube which have a widening of the measuring tube cross-section.

10. The ultrasonic flowmeter according to claim 9, wherein the measuring tube has a cross-sectional reduction or a cross-sectional expansion in the course of the first signal path and the second signal path.

11. The ultrasonic flowmeter according to claim 9, wherein the ultrasonic transducers are arranged such that at least the first section of the first signal path and of the second signal path allows the flowing medium to flow in the range r=0.5 R or r>0.5 R or r>0.3 R, where R denotes the radius of the measuring tube cross-sectional area in the region of the measuring tube inlet upstream of the first ultrasonic transducer and the third ultrasonic transducer.

12. A method of using an ultrasonic flowmeter in a shut-off device, comprising:
    providing a shut-off device having a flow channel and a blocking device arranged in the flow channel, wherein the blocking device has a blocking body receptacle and a blocking body movable in the blocking body receptacle, wherein the flow cross-section for the medium in the blocking device and thus in the flow channel can be changed by moving the blocking body in the blocking body receptacle, wherein the flow channel has an inlet region upstream of the blocking device as viewed in the direction of flow;
    providing an ultrasonic flowmeter having at least one measuring tube formed as part of the flow channel, at least one first ultrasonic transducer pair including a first ultrasonic transducer and a second ultrasonic transducer and at least one second ultrasonic transducer pair including a third ultrasonic transducer and a fourth ultrasonic transducer, wherein each ultrasonic transducer is designed as an ultrasonic transmitter and/or as an ultrasonic receiver;
    arranging the first ultrasonic transducer pair on the measuring tube offset in the direction of flow such that the respective transmitter transmits an ultrasonic signal in the direction of flow or against the direction of flow during operation;
    receiving, with the receiver, the ultrasonic signal transmitted by the transmitter after at least one reflection, wherein at least one reflecting surface is provided, and wherein the course of the ultrasonic signal defines a first signal path between the first ultrasonic transducer and the second ultrasonic transducer;
    arranging the second ultrasonic transducer pair on the measuring tube offset as viewed in the direction of flow such that the respective transmitter transmits an ultrasonic signal in the direction of flow or against the direction of flow during operation; and
    receiving, with the receiver, the ultrasonic signal transmitted by the transmitter after at least one reflection, wherein at least one reflecting surface is provided, and wherein the course of the ultrasonic signal defines a second signal path between the third ultrasonic transducer and the fourth ultrasonic transducer;
    wherein the first ultrasonic transducer of the first ultrasonic transducer pair and the third ultrasonic transducer of the second ultrasonic transducer pair are arranged on the circumference of a first measuring tube cross-sectional area, and furthermore the second ultrasonic transducer of the first ultrasonic transducer pair and the fourth ultrasonic transducer of the second ultrasonic transducer pair are arranged on the circumference of a second measuring tube cross-sectional area;
    wherein the signal course of the first signal path has a first direction of rotation with respect to the measuring tube axis;
    wherein the signal course of the second signal path has a second direction of rotation, wherein the second direction of rotation is opposite the first direction of rotation;
    wherein the first signal path and the second signal path have at least one common reflecting surface; and
    wherein the at least one common reflecting surface is an intentional reflection surface that is inserted or machined into the measuring tube.

13. The method according to claim 12, wherein the ultrasonic flowmeter is designed such that a mirror plane is defined by a measuring tube axis of the measuring tube and a line perpendicular to the measuring tube axis, which divides the measuring tube in axial plan view into a first half and a second half; and
    wherein the second signal path substantially corresponds to a reflection of the first signal path at the mirror plane.

14. A shut-off device, comprising:
    an ultrasonic flowmeter;
    a flow channel; and
    a blocking device arranged in the flow channel;
    wherein the blocking device has a blocking body receptacle and a blocking body movable in the blocking body receptacle, wherein the flow cross-section for the medium in the blocking device and thus in the flow channel can be changed by moving the blocking body in the blocking body receptacle, wherein the flow channel has an inlet region upstream of the blocking device as viewed in the direction of flow;

wherein the ultrasonic flowmeter has at least one measuring tube formed at least as part of the flow channel, at least one first ultrasonic transducer pair comprising a first ultrasonic transducer and a second ultrasonic transducer and at least one second ultrasonic transducer pair including a third ultrasonic transducer and a fourth ultrasonic transducer, wherein each ultrasonic transducer is designed as an ultrasonic transmitter and/or as an ultrasonic receiver;

wherein the first ultrasonic transducer pair is arranged on the measuring tube offset in the direction of flow such that the respective transmitter transmits an ultrasonic signal in the direction of flow or against the direction of flow during operation;

wherein the receiver receives the ultrasonic signal transmitted by the transmitter after at least one reflection, wherein at least one reflecting surface is provided, and wherein the course of the ultrasonic signal defines a first signal path between the first ultrasonic transducer and the second ultrasonic transducer;

wherein the second ultrasonic transducer pair is arranged on the measuring tube offset as viewed in the direction of flow such that the respective transmitter transmits an ultrasonic signal in the direction of flow or against the direction of flow during operation;

wherein the receiver receives the ultrasonic signal transmitted by the transmitter after at least one reflection, wherein at least one reflecting surface is provided, and wherein the course of the ultrasonic signal defines a second signal path between the third ultrasonic transducer and the fourth ultrasonic transducer;

wherein the first ultrasonic transducer of the first ultrasonic transducer pair and the third ultrasonic transducer of the second ultrasonic transducer pair are arranged on the circumference of a first measuring tube cross-sectional area, and furthermore the second ultrasonic transducer of the first ultrasonic transducer pair and the fourth ultrasonic transducer of the second ultrasonic transducer pair are arranged on the circumference of a second measuring tube cross-sectional area;

wherein the signal course of the first signal path has a first direction of rotation with respect to the measurement tube axis, the signal course of the second signal path has a second direction of rotation, and the second direction of rotation is opposite the first direction of rotation;

wherein the first signal path and the second signal path have at least one common reflecting surface; and wherein the at least one common reflecting surface is an intentional reflection surface that is inserted or machined into the measuring tube.

15. The shut-off device according to claim 14, wherein the ultrasonic flowmeter is designed such that a mirror plane is defined by a measuring tube axis of the measuring tube and a line perpendicular to the measuring tube axis, which divides the measuring tube in axial plan view into a first half and a second half; and wherein the second signal path substantially corresponds to a reflection of the first signal path at the mirror plane.

16. The ultrasonic flowmeter according to claim 3, wherein the signal course of the first signal path has the shape of a triangle; and wherein the signal course of the second signal path has the shape of a triangle.

\* \* \* \* \*